(12) United States Patent
Nolan (10) Patent No.: US 11,070,938 B2
(45) Date of Patent: Jul. 20, 2021

(54) GEO-LOCATION FENCES-BASED TRANSIENT MESSAGES

(71) Applicant: ANTITECH SOLUTIONS LIMITED, Dublin (IE)

(72) Inventor: Andrew Nolan, Dublin (IE)

(73) Assignee: ANITECH SOLUTIONS LIMITED

( * ) Notice: Subject to any disclaimer, the term of this patent is extended or adjusted under 35 U.S.C. 154(b) by 0 days.

(21) Appl. No.: 16/608,594

(22) PCT Filed: Apr. 17, 2018

(86) PCT No.: PCT/EP2018/059800
§ 371 (c)(1),
(2) Date: Oct. 25, 2019

(87) PCT Pub. No.: WO2018/197271
PCT Pub. Date: Nov. 1, 2018

(65) Prior Publication Data
US 2020/0186960 A1   Jun. 11, 2020

(30) Foreign Application Priority Data

Apr. 25, 2017  (GB) .................................... 1706543

(51) Int. Cl.
| | | |
|---|---|---|
| *H04W 24/00* | (2009.01) | |
| *H04W 4/021* | (2018.01) | |
| *G06Q 30/02* | (2012.01) | |
| *H04W 4/12* | (2009.01) | |

(52) U.S. Cl.
CPC ........ *H04W 4/021* (2013.01); *G06Q 30/0259* (2013.01); *G06Q 30/0261* (2013.01); *H04W 4/12* (2013.01)

(58) Field of Classification Search
CPC ....... H04W 4/021; H04W 4/029; H04W 4/12; H04W 60/00; H04W 4/21; H04W 4/023; H04W 4/027
USPC .................................. 455/456.3, 413, 456.2
See application file for complete search history.

(56) References Cited

U.S. PATENT DOCUMENTS

| | | | |
|---|---|---|---|
| 9,094,137 B1* | 7/2015 | Sehn ....................... H04L 51/20 |
| 2012/0151282 A1* | 6/2012 | Watanabe ............. G06F 11/076 |
| | | | 714/49 |
| 2012/0276928 A1 | 11/2012 | Shutter | |
| 2013/0143586 A1 | 6/2013 | Williams et al. | |
| 2015/0262258 A1 | 9/2015 | Schonbeck | |
| 2015/0350351 A1* | 12/2015 | Tung ....................... H04W 4/21 |
| | | | 709/204 |
| 2016/0007151 A1* | 1/2016 | Birch ................ H04M 1/72572 |
| | | | 455/456.3 |
| 2019/0306090 A1* | 10/2019 | Shang ..................... H04L 51/20 |

FOREIGN PATENT DOCUMENTS

WO      2015131233 A1    9/2015

\* cited by examiner

*Primary Examiner* — Joseph Arevalo
(74) *Attorney, Agent, or Firm* — Tarolli, Sundheim, Covell & Tummino LLP (57) ABSTRACT

Provided are a computer-implemented method and system for providing and accessing electronic messages, where message distribution is based on geo-coordinates, device proximity, time of day, and user interaction.

13 Claims, 9 Drawing Sheets

| Position 1 | Position 2 | Position 3 | Position 4 |
|---|---|---|---|
| Message 1 | Message 7 | Message 2 | Message 4 |
| Message 3 | Message 8 | Message 5 | |
| Message 1 | | | |

GEO-LOCATION FENCES-BASED TRANSIENT MESSAGES

RELATED APPLICATIONS

The present invention is a U.S. National Stage under 35 USC 371 patent application, claiming priority to Serial No. PCT/EP2018/059800, filed on 17 Apr. 2018; which claims priority of GB 1706543.4, filed on 25 Apr. 2017, the entirety of both of which are incorporated herein by reference.

FIELD

The present disclosure relates to the distribution of electronic messages in a computer network, and more specifically, methods and systems for publishing and accessing transient geo-location fences-based messages via a mobile device.

BACKGROUND OF THE INVENTION

The rise of smart device messaging technology has had a significant impact on traditional business models over the course of the last decade. The rules around virtually everything—from how a consumer buys, to how brands engage and advertise—are constantly being re-written by these disruptive innovations. Consumers now expect anytime, anywhere, computing and as such, look to the smartphone as their first point of contact with people, news, retailers, and brands.

These patterns are supported by the recent explosion of new solutions, technologies and strategies employed by brands and merchants in both retail and hospitality sectors to use digital as a means of connecting with consumers. From social media platforms to mobile apps, retailers, brands and technology partners alike are using innovative solutions to drive traffic in-store, engage near-store shoppers and provide them with personalised offers.

Mobile device innovations in social media are vast: ranging from peer-to-peer chat platforms—which allow users exchange messages with other users in their social circles and beyond—to broadcast messaging platforms, which facilitate one-to-many message exchanges, and geo-location based services, which distribute messages on the basis of a consumer's device location.

Many of the methods supporting the latter category focus on optimising the distribution of electronic messages, promotions, offers or alerts to users based on time of day and their geo-location. In specific instances, users will only receive electronic messages to their client devices, such as a mobile phone, once they enter a geo-location fence and if those electronic messages have not expired based on the time of day. For example, users could receive near-store, or in-store, alerts or promotions once they enter a pre-defined geo-location fence associated with that store.

These systems are extremely effective in fulfilling the distribution of user-published messages—be they text and/or image and/or video media—to a wider audience; however, such systems do not consider how the messages are consumed by users on their mobile devices.

In view of the above, there is a need for an automated solution for optimising the distribution of such messages.

SUMMARY OF THE INVENTION

The present disclosure describes a geo-location fence-based transient message, which is a geo-location fence-bound, electronic message, that is published at, and accessible from, a specific physical location until a limit on the number of times the message can be saved or deleted on client devices has been exceeded, or a finite period of time has elapsed. The present disclosure provides a mechanism to publish an electronic message at a specific location, create a geo-location fence around the message, wherein the message may be received on a mobile device, specify upper limits on how many times that message can be saved or deleted on client devices, use those limits, along with time-to-live data, to define the lifetime of the geo-location fence around the message, and finally, a means for a user to save or delete the message on client device before the geo-location fence expires.

The present disclosure provides computer-implemented methods as detailed in claims 1 and 15, a server device according to claim 24, a client device according to claim 25, and a computer-readable medium according to claim 27. Advantageous features are provided in dependent claims.

The present disclosure provides a location, time-specific and user action-oriented message distribution method and corresponding system, where message distribution is based on geo-coordinates, device proximity, time of day, and user interaction.

A mechanism is described for providing access to an electronic message published according to a specific set of geo-coordinates, and with its own temporary geo-location fence (or "geo-fence")—for consumption by user client devices based on time of day, device location, and device-driven user interaction—and allowing users delete or save these messages to their device before the geo-fence expires.

A computer implemented method according to the present disclosure includes receiving a message and corresponding message meta-data, comprising geo-location, time-to-live and user interaction limit data, from a device sending the message. The geo-location data comprises a set of geo-coordinates, at which that message is to be published, along with a geo-range, which is used to create a transient geo-fence around the geo-coordinates. The time-to-live data comprises a specific time duration, after which the geo-fence can be configured to expire, relative to a publication time. The publication time is the time at which the message is received by a server device from the sender device. The user interaction limit data comprises at least two settings: a Save Upper Limit, which defines the maximum number of times the message can be saved to client devices before the geo-fence is destroyed, and a Delete Upper Limit, which defines the maximum number of times the message can be deleted via client devices before the geo-fence is destroyed. These upper limits control the expiration of the geo-fence around the message, and if these limits are not reached within the timeframe defined by the time-to-live data, the geo-fence will expire according to that timeframe. Further, the range of the geo-fence may be automatically reduced as the Save and Delete Upper Limits are approached. The message itself is supplied in response to a request from a client device if the geo-fence has not expired, and if the client device is within the location boundaries defined by the geo-fence. This message can then be deleted by a user, if desired, or saved to a client device if desired; both scenarios may impact the transient nature and range of the message's geo-fence.

DETAILED DESCRIPTION OF THE INVENTION

The present disclosure provides a location, time-specific and user action-oriented message distribution method and corresponding system, whereby message distribution is based on geo-coordinates, device proximity, user interaction and time.

The system is configured to associate an electronic message with a specific set of geo-coordinates, representing a physical location, and its own short-lived geo-location fence around the geo-coordinates, and to distribute that message to any client device, upon request, whose geo-location falls within the geo-fence, defined for that message, within the lifetime of the geo-fence.

The message comprises: geo-coordinates associated with the message, a geo-range used to form the geo-fence, at least one of text, image and video content; user interaction limit data comprising at least two metrics defining the maximum number of times the message may be saved or deleted by client devices before the geo-fence is destroyed, and time-to-live data comprising an expiration time for the geo-fence if the user interaction limits have not been exceeded. The expiration time refers to a duration of time starting from the publication time at which the message is received by a server. The user interaction limit data comprises a Save Upper Limit, which defines the maximum number of times the message can be saved to client devices before the geo-fence is destroyed, and a Delete Upper Limit, which defines the maximum number of times the message can be deleted via client devices before the geo-fence is destroyed.

In this sense, the system is entirely independent of destination user or device information, more so focusing on short-lived messages bound by location and client devices that are in range, where user preferences and interactions, via those client devices, determine the messages received to that device, and a plurality of other devices.

Once a message has been retrieved by a client device, it can be deleted or saved directly to the device. This user action of saving the message, or deleting the message, contributes to a count towards upper limits specified for that message. Once these limits are reached, the geo-fence is destroyed and the message is no longer accessible by any users.

The system uses the concept of geo-fencing, but makes the message the central entity, rather than a location, and applies transient factors against the geo-fence, rather than the message. The system is configured for the sender to send geo-coordinates of a location and a geo-range with each message, which are then used to create a virtual geo-fence, only at that location, for each message sent. The geo-fence is destroyed when the maximums specified by the user interaction limit data, for that message, are reached, or when the time-to-live period for that message has expired. The message associated with this geo-fence can only be received by any user or client device within the lifetime of the geo-fence, based on a user request from the user or client device.

In short:
  The sender sends a message which includes time-to-live data, user interaction limit data, a set of geo-coordinates, and a geo-range, which collectively define a geo-fence around the geo-coordinates in which the message is accessible during the lifetime of the geo-fence.
  The system uses this information to create the geo-fence at that location for that message, for the duration of its lifetime.
  Users can receive the message within the geo-fence and based on review, they may do nothing, or may choose to save that message to their device, or delete that message so they do not ever receive it again within that geo-fence. These latter two user interactions contribute towards incremental counters, which are tracked by the system and constantly compared against the user interaction limits specified for the message.
  The geo-fence for the message is destroyed when either the Save Upper Limit has been reached, the Delete Upper Limit has been reached, or the expiration time corresponding with the time-to-live data of the message has elapsed.

In an example of this embodiment, a retailer may wish to extend an offer to near-store consumers. This offer may be limited to the first 20 people only, and may only be valid for one day. In this instance, the retailer can set the maximum number of times this message can be saved to 20, and set the time-to-live to 24 hours. Additionally, if they feel there would be value in having this message expire based on lack of interest from consumers, they may set the maximum number of times the message can be deleted via client devices to 60. If the maximum number of save actions is reached first, the geo-fence is destroyed. If the maximum number of delete actions is reached first, the geo-fence is destroyed. If neither the maximum number of save actions nor delete actions are reached within the 24-hour period, the geo-fence is destroyed at completion of 24 hours. In all three instances, there is valuable feedback available to the retailer based on device interactions by a plurality of users.

The system also provides administrative functions that allows the sender to modify each geo-location fence-based message, where required. The sender can update all factors that contribute to the definition of the geo-fence of the message that they have published, including the geo-coordinates, geo-range, time-to-live and user interaction limit data.

The system may use GPS information when a user request from a client device is made to determine all relevant geo-fences in which the current coordinates of the client device resides, and then to retrieve any messages that are associated with these geo-fences.

Each message retrieved by the client device comprises the following data:
  Geo-coordinates associated with the message.
  Distance from the current geo-coordinates of the client device to the geo-coordinates associated with the message, and a description of directions from the current geo-coordinates of the client device to the geo-coordinates associated with the message.

Text and/or image and/or video content.

Time since the message was published.

Number of times remaining that the message may be saved to client devices, before the geo-location fence-based message is no longer accessible.

Number of times remaining that the message may be deleted by client devices, before the geo-location fence-based message is no longer accessible.

Amount of time remaining until the geo-location fence-based message expires.

From an individual user's perspective, the system maintains a unique list of messages returned per user. That is, the list of messages returned for that user may be refined by the user interaction on the device. As noted previously, users can actively save or delete a unique message, which contributes to the lifecycle of the corresponding geo-fence for that message. These actions also shape the list of messages returned to that user. Once a unique message has been saved to a client device, or deleted from the message list, by the user, it will no longer be returned to the user. This means that upon return to any location that falls within the geo-fences of messages, i.e. unexpired geo-location based-messages, previously deleted or saved messages will not be returned.

Whilst this interaction is important in respect of the messages returned to that user, it is equally important for a plurality of users as this interaction impacts on the lifecycle of the geo-fence in which the message resides:

The sender sets a Save Upper Limit defining the maximum number of times the message can be saved to client devices.

The sender sets a Delete Upper Limit defining the maximum number of times the message can be deleted via client devices.

Each interaction by each user is stored on the server, and each interaction contributes to system counters tracking the Save and Delete Upper Limits for the message.

When either the Save Upper Limit or Delete Upper Limit is reached, the geo-fence associated with the message is destroyed.

If neither the Save Upper Limit nor the Delete Upper Limit is reached before the expiration time, determined by the time-to-live data for that message, has elapsed, the geo-fence is destroyed when the expiration time determined by the time-to-live data has elapsed.

Once the geo-fence has been destroyed, the message can no longer be received by any user.

Figure 1:
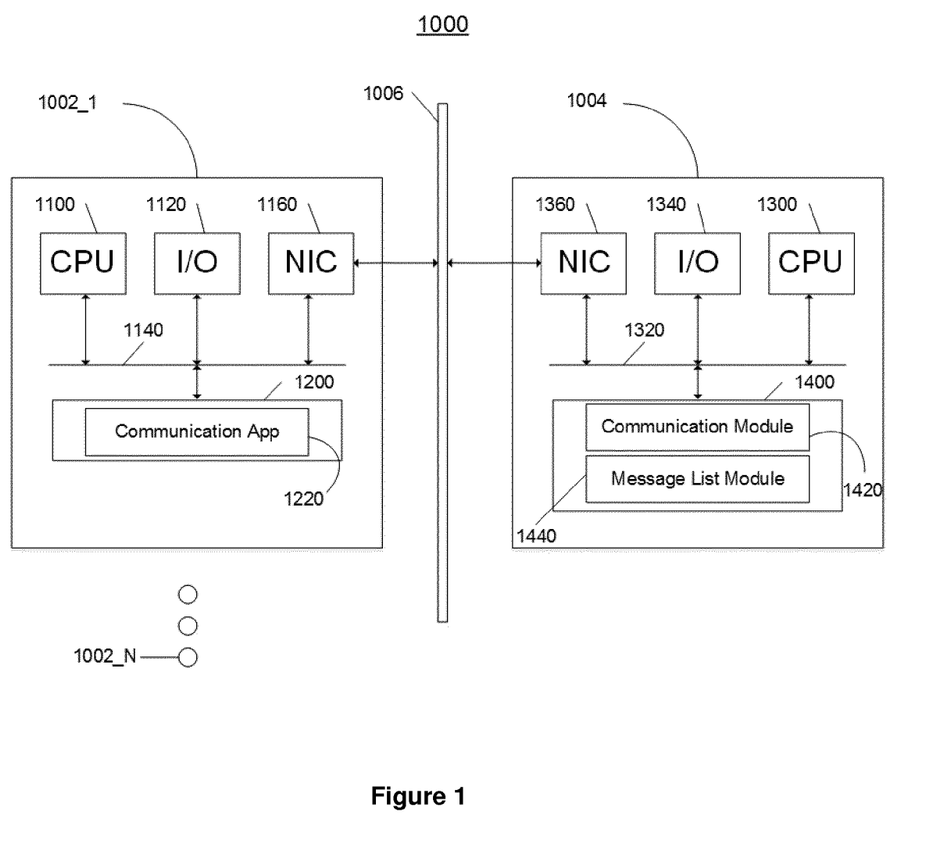
FIG. 1 illustrates a system for providing and accessing geo-location fences-based transient messages, in accordance with an embodiment of the present disclosure.

FIG. 1 illustrates a system 1000 for providing and accessing geo-location fences-based messages, according to an embodiment of the present disclosure. The system 1000 includes a set of client devices 1002_1 through to 1002_N, and at least one server 1004 connected via a network 1006. The network may be any combination of wired or wireless networks.

The client devices 1002 include various hardware and software components that function to perform method steps according to the present disclosure. Each client device 1002 has standard components, such as a central processing unit 1100, which may comprise one or more processors, and input/output devices 1120 connected via a network bus 1140. The input/output devices 1120 may include a touch display, dedicated control buttons, physical connectors, speakers, or similar. A network interface circuit 1160 is also connected to the network bus 1140 and enables connectivity to the network 1006. A memory 1200 is also connected to the bus 1140, and stores a communication application 1220, which includes instructions executed by the CPU 1100 in order to coordinate communications with the server 1004.

The client devices 1002 may include tablets, mobile devices, smartphones, wearable technology and laptop computers.

The server 1004 may also include standard components, such as a central processing unit 1300, a bus 1320, input/output device 1340 and a network interface circuit 1360, which enables connectivity with the network 1006. The CPU 1300 may include one or more processors, a multi-processor core, or some other type of processor, depending on the particular implementation. A memory 1400 may be connected to the bus 1320, and stores a communications module 1420, which includes instructions executed by the CPU 1300 to coordinate communications with the client devices 1002_1 to 1002_N. The memory 1400 may be configured to store a message list module 1440. The message list module 1440 may include instructions executed by the CPU 1300 to store published messages. These messages form a list of messages, which may be supplied to a client device 1002 in response to a request from the client device 1002.

Figure 2:
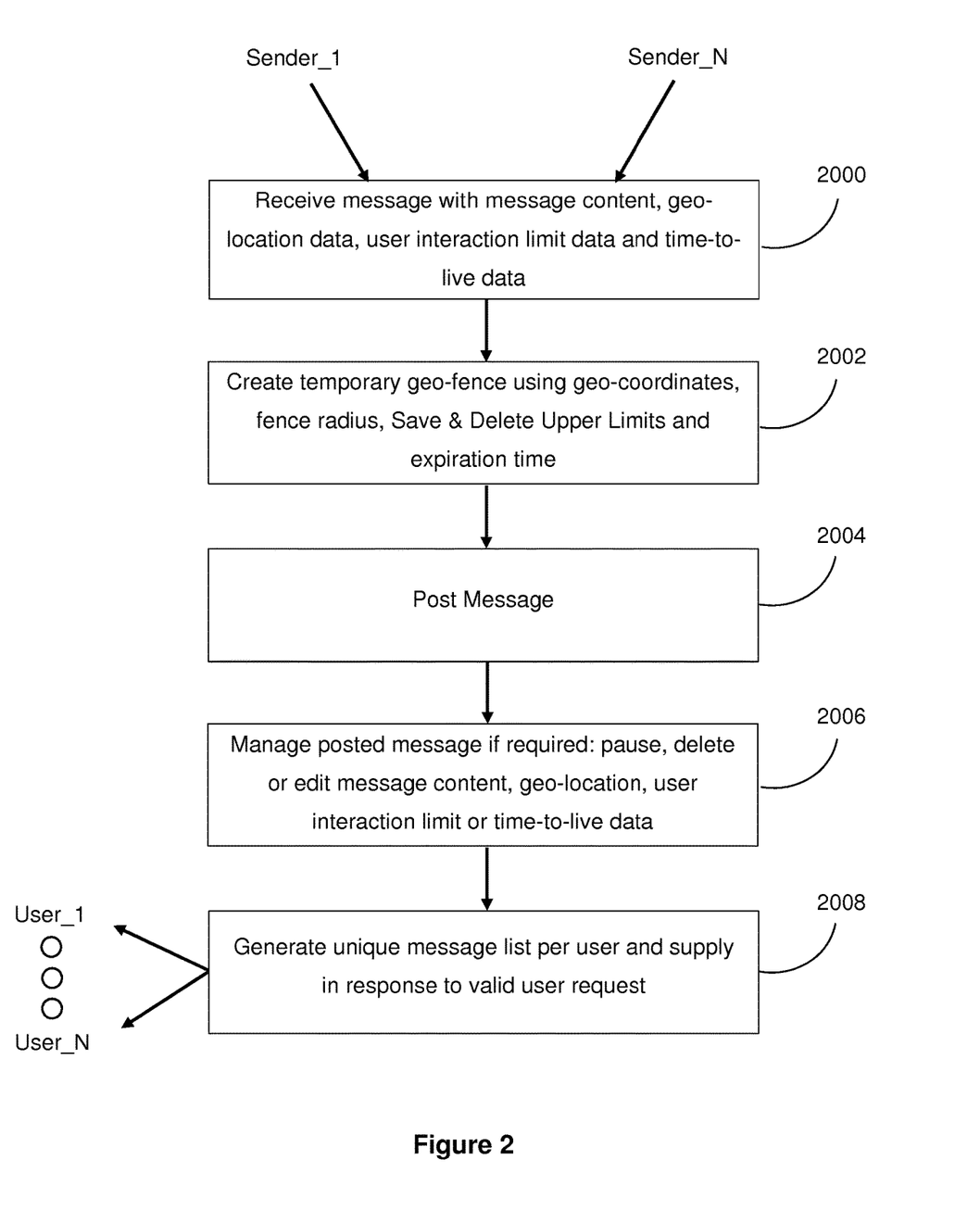
FIG. 2 is a flowchart of a method, performed by a server device, for providing access to geo-location fences-based transient messages, according to an embodiment of the present disclosure.

FIG. 2 is a flowchart of a method, performed by the server 1004, for providing access to messages, according to an embodiment of the present disclosure. The top of the figure illustrates a set of sender devices: Sender_1 through to Sender_N.

As described earlier, messages from sender devices include geo-location, user interaction limit and time-to-live data. The server 1004 receives such messages, including message content, geo-location, user interaction and time-to-live data 2000 from any number of senders. A geo-fence is created using the geo-location, user interaction and time-to-live data of the message 2002. The message may be posted using the geo-fence 2004. That is, the message may be allowed to be accessed by a client device 1002 from within the geo-fence while it is still live. It will be understood by the skilled person that a live message is one that is associated with an unexpired geo-fence. The method may comprise destroying the geo-fence when at least one of the Save Upper Limit and Delete Upper Limit is reached. The method may also comprise destroying the geo-location fence when the time duration corresponding to the time-to-live data expires.

The message list module 1440 provides a list of messages appropriate to all sender devices and users. The list of messages provides a view of all messages ever posted and the message list module 1440 provides an administration interface to allow senders optionally edit live messages 2006, whereby the sender can update, pause, or delete a live message. An update may take the form of editing the content, geo-location, user interaction limit or time-to-live data. The message list module 1440 generates a dynamic message list, unique to each user, which is maintained according to their geo-location and device interactions, and returned in response to requests 2008 from any number of users. Each message may comprise at least one of text, image and video content.

Figure 3:
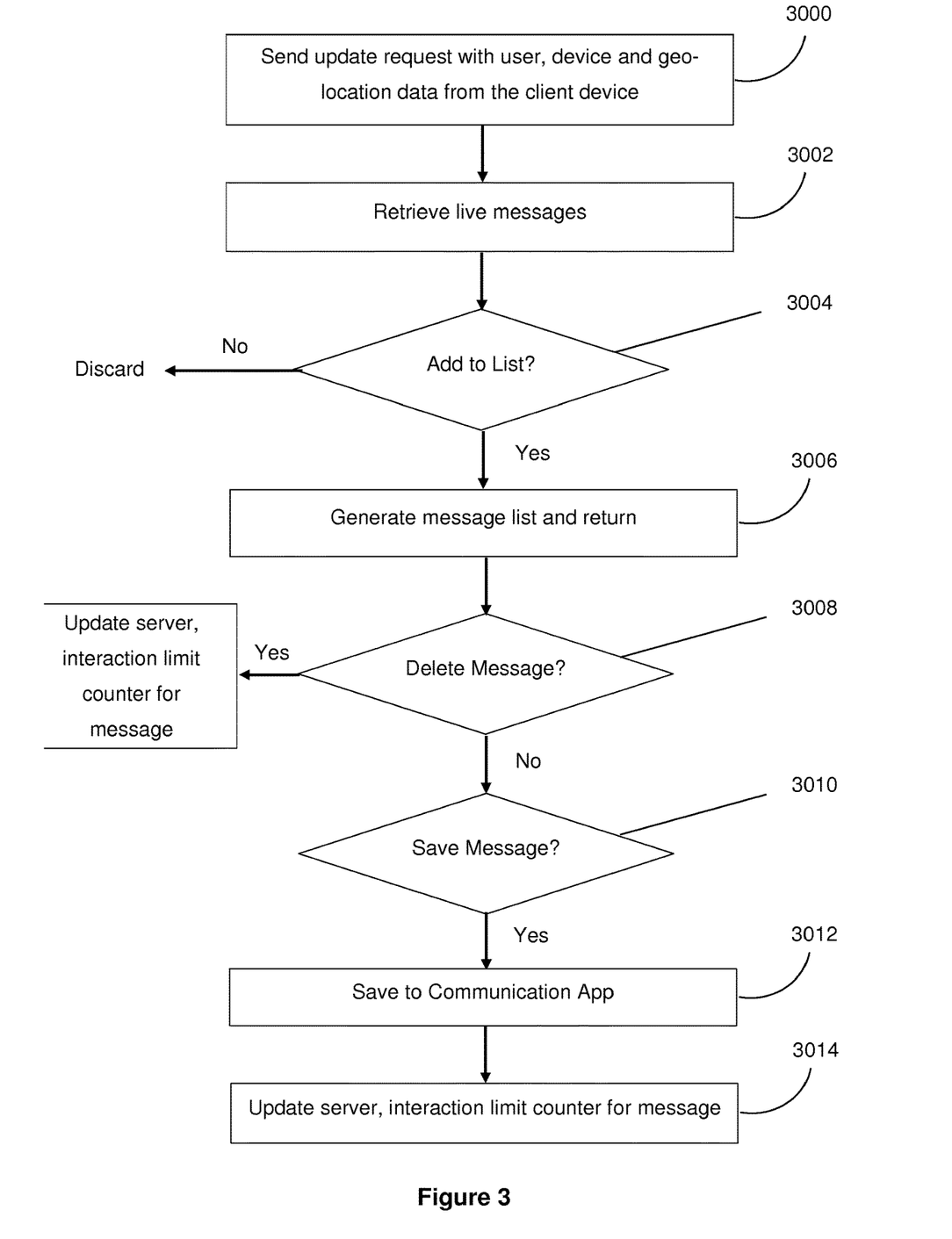
FIG. 3 is a flowchart of a method, performed by a client device, for accessing geo-location fences-based transient messages, according to an embodiment of the present disclosure.

FIG. 3 is a flowchart of a method, performed by the client device 1002, of accessing messages from a server device, according to an embodiment of the present disclosure. The method of FIG. 3 may be performed by the communication application 1220 resident on the client device 1002. The communication application 1220 is configured to generate a request with geo-location data for the client device 1002. Typically, the geo-location data may be obtained from a GPS device resident in the client device 1002. However, other geo-location information may also be used, such as cellular network geo-location information, self-reported geo-location, and similar. The communication application 1220 may be configured to send an update request 3000 with the current geo-coordinates of the client device 1002 and registered user and device information to the server 1004. The update request may be triggered by the registered user requesting a list of messages relevant to them. The message list module 1440 in the server 1004 may be configured to calculate the live messages relevant to the user update request 3002. The message list module 1440 may use the input geo-location data to calculate all messages corresponding to respective transient geo-fences associated with the messages in which the geo-coordinates of the device are located at the time of retrieval.

The message list module 1440 determines which messages should be added to a message list for that update request. If it is determined that live messages, appropriate to the current geo-location data of the client device 1002, have previously been received at the client device 1002 in a dynamic message list via a previous update request, such live messages are included as part of the dynamic message list. If live messages, appropriate to the current input geo-coordinates, have previously been received at the client device 1002 in a message list via a previous update request 3000 and then subsequently saved or deleted by the user, they will be discarded (3004—No); otherwise the message will be added to a message list (3004—Yes). The message list may be ordered according to the geo-location fence-based messages due to expire first to last, and returned to the user 3006. The expiration criteria incorporates the user interaction limit and time-to-live data. The user can then review the list of messages on the client device 1002. If the user deletes a message, the server 1004 may be updated with the user and message details (3008—Yes.) This means the message will never be returned to the user even if the user triggers an update from within the same transient geo-fence of that message. Furthermore, the counter tracking the Delete Upper Limit for that geo-fence is incremented by one. If the counter reaches the maximum limit as defined by the Delete Upper Limit, the geo-fence for this message is destroyed. If the user does not delete a message, it is maintained in the returned message list (3008—No.) If the user saves a message (3010—Yes) the message may be saved directly 3012 on the communication application 1220 on the client device 1002. The server 1004 may be updated and the counter tracking the Save Upper Limit for that geo-fence is incremented by one 3014. If the counter reaches the maximum limit as defined by the Save Upper Limit, the geo-fence for this message is destroyed. In this instance, the user has saved the message on their device and can review it later on their device, even after the geo-fence for that message has expired on the server 1004. A user may save a message that represents a limited offer or promotion, for example, in order to redeem later with a retailer.

Figure 4:
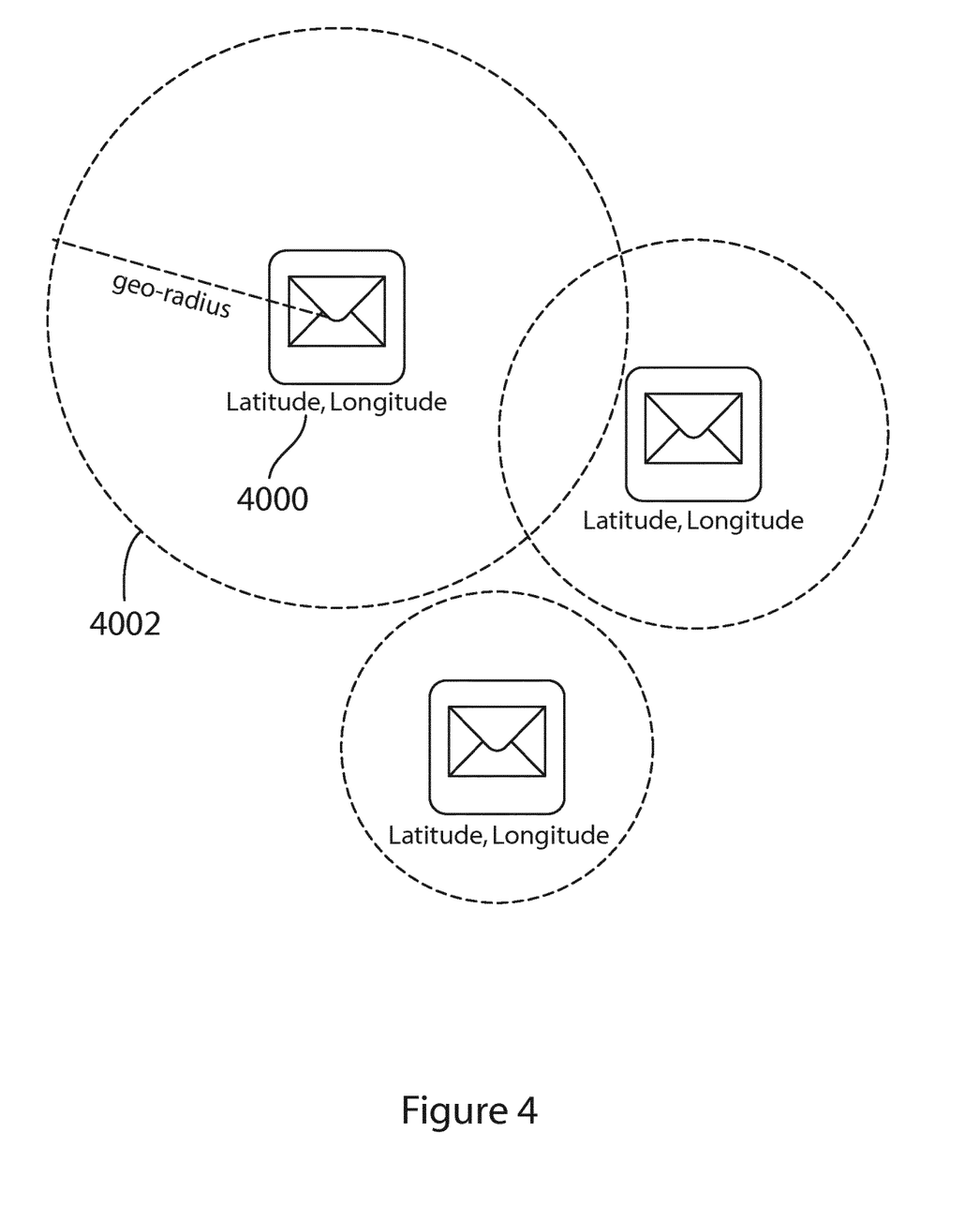
FIG. 4 illustrates a conceptual view of a geo-location fences-based transient message, according to an embodiment of the present disclosure.

FIG. 4 provides a conceptual view of a geo-location fences-based message 4000, according to an embodiment of the present disclosure. Referring to FIG. 4, the message comprises geo-location data. More specifically, the message 4000 is published to specific geo-coordinates, which may comprise latitude and longitude values that may be described in decimal degrees. A geo-fence 4002 may be created around the geo-coordinates associated with the message 4000. In the example illustrated in FIG. 4, the geo-fence 4002 may be created with reference to a radius from the geo-coordinates associated with the message 4000. In this example, a number of messages are each published at a specific set of coordinates, and form the basis of a geo-fence, in which the messages can be accessed by user client devices, for the duration of the lifetime of their corresponding geo-fence. As noted previously, each message has a defined upper limit for the number of Save and Delete actions performed by users on client devices. The radius of the geo-fence may be configured to automatically decrease as the Save Upper Limit counter value approaches the Save Upper Limit for that message or the Delete Upper Limit counter value approaches the Delete Upper Limit for that message. That is, the method may comprise automatically reducing the range of the geo-fence as at least one of the Save and Delete Upper Limits are approached.

Figure 5:
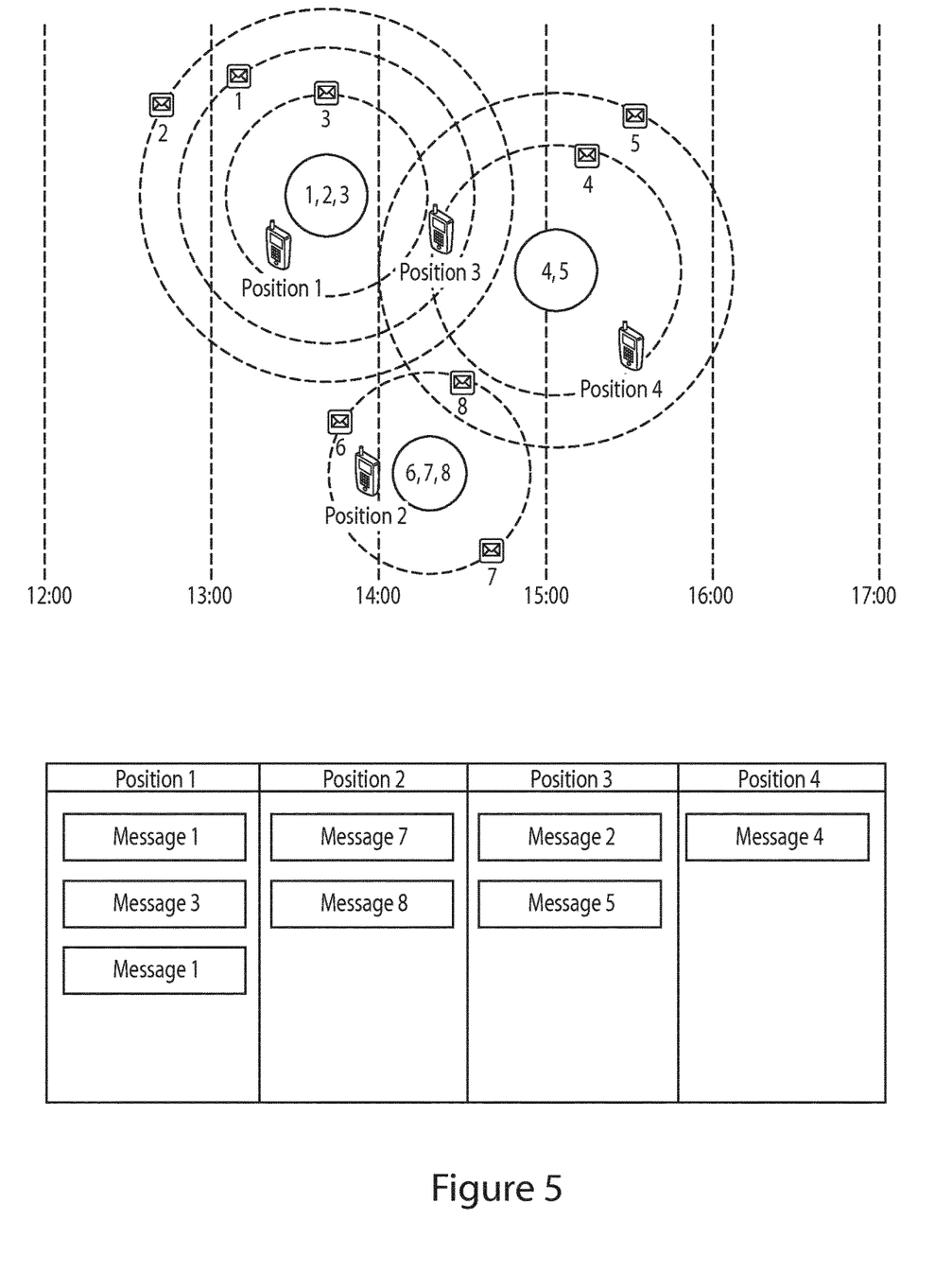
FIG. 5 illustrates system processing at various locations, according to an embodiment of the present disclosure.

FIG. 5 provides a view of a client device moving between geo-fences of messages linked to geo-coordinates of three physical locations, and a respective list of messages that may appear to a user using this device, based on a user update request at a specific time of day, and that location shown, in the table below.

In this particular example, each geo-location fence based-message has a geo-fence that has been created according to the corresponding geo-location, user interaction limit and time-to-live data for that message. For each message, there is a set of geo-coordinates, a publication time, an expiration time, which is calculated according to the time-to-live duration, a Save Upper Limit (SUL) and a Delete Upper Limit (DUL) value.

Messages 1, 2 and 3 are all published at the same set of geo-coordinates, but with varying range and transiency of geo-fence. A similar profile applies to Message set 4 and 5, and Message set 6, 7 and 8. The table below shows the publication time, time-to-live, and user interaction limit data for each of Messages 1 to 8.

| Message | Publication time | Expiration time | Save Upper Limit | Delete Upper Limit |
| --- | --- | --- | --- | --- |
| 1 | 12:00 | 15:00 | 20 | 40 |
| 2 | 13:00 | 18:00 | 10 | 50 |
| 3 | 12:30 | 15:45 | 100 | 500 |
| 4 | 15:00 | 15:50 | 2000 | 1000 |
| 5 | 12:45 | 22:00 | 5 | 10 |
| 6 | 12:00 | 12:35 | 500 | 500 |
| 7 | 12:00 | 15:10 | 50 | 20 |
| 8 | 12:00 | 14:00 | 10000 | 20000 |

The client device moves from Position 1 to Position 4 within the time frames displayed. In each position, an update request is made for relevant, live, messages. A unique list is created and returned according to every request. Messages may be returned in a sequence according to the list of messages set to expire first, and only include messages not previously deleted or saved by the user using the client device.

In Position 1, no messages have yet been saved or deleted by client devices and hence the list of live messages returned in this position is ordered according to expiration time of the corresponding geo-fences.

In Position 2, Message 7 has been deleted 18 times across client devices, meaning the corresponding radius of the geo-fence is reduced and the list of live messages returned in this position ensures this message is prioritised accordingly. Note that whilst the client device is located at Position 2, the Save Upper Limit (SUL) value is exceeded for Message 1, due to the message being saved more than 20 times, across other client devices within the geo-fence for Message 1.

At Position 3, whilst the corresponding expiration time has not elapsed, the geo-fence for Message 1 has been destroyed as the SUL has been reached. Note that at Position 3, the user on the client device deletes Message 5 from their unique list.

At Position 4, the client device is within the geo-fence of Message 5 but this message is not returned in the user list as the user had previously deleted it.

In another embodiment, the system may be configured to provide notifications to the client device of messages accessible in geo-fences that are nearby, i.e., within some range of the current geo-location of the client device. In this scenario, the client device is not located within those geo-fences, so the user cannot perform save or delete actions on the corresponding messages on the client device, but upon review of these notifications, the user may move to a location within the bounds of these geo-fences so that they may do so. In this regard, the system may be configured to provide a notification to a client device of a message accessible in a geo-location fence that is within a predetermined range of the current geo-location of the client device, the current geo-location of the client device not within the geo-location fence.

Figure 6:
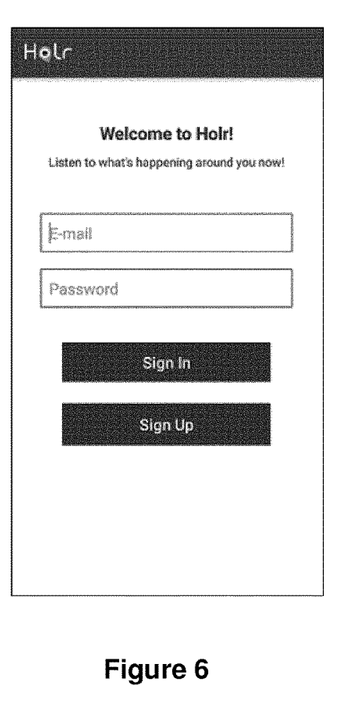
FIGS. 6-10 illustrate graphical user interfaces that may be associated with embodiments of the present disclosure.
Figure 7:
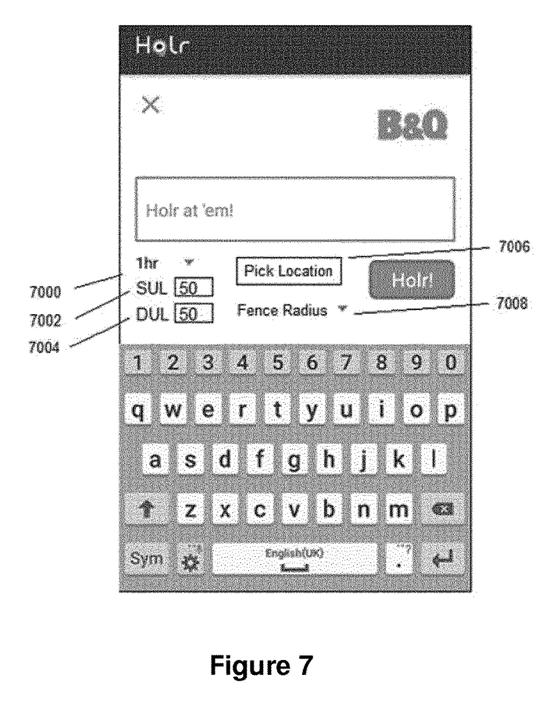
Figure 8:
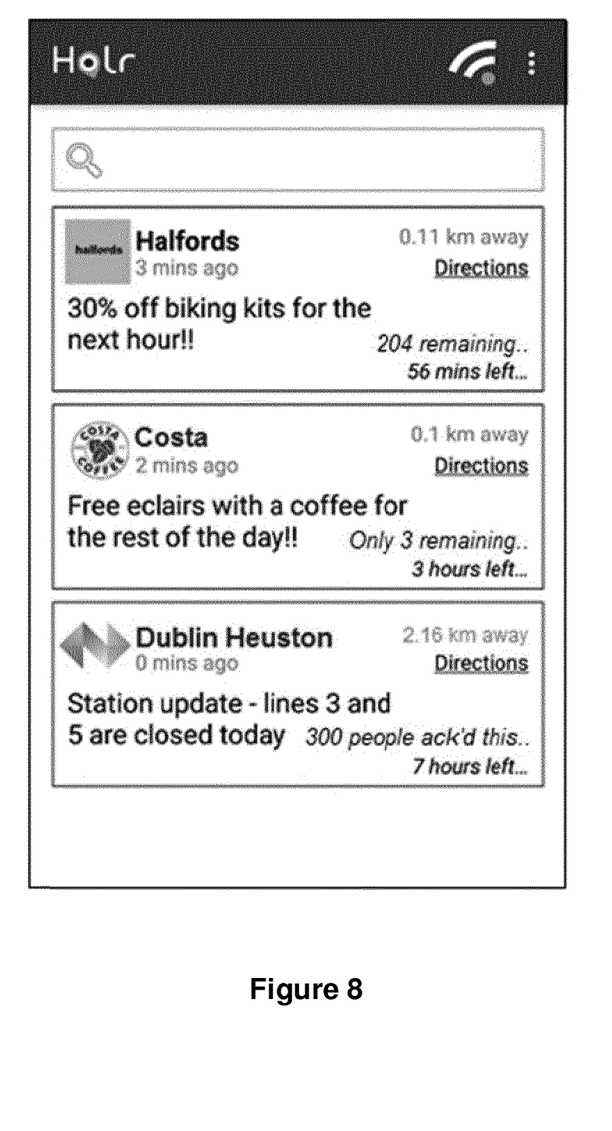

FIG. 6 illustrates a screenshot showing an example of how sender and receiver users may sign up and register to send and receive messages, according to an embodiment of the present disclosure. Senders may specify a set of geo-coordinates to serve as the base coordinates for all message geo-fences, if desired, or send the geo-coordinates on a message-by-message basis. FIG. 7 illustrates an example of an interface used by a sender to create a message, whereby the time duration 7000, which is used to calculate the expiration time, Save Upper Limit 7002, Delete Upper Limit 7004, geo-coordinates 7006 and a geo-radius 7008 are specified. FIG. 8 illustrates a screenshot showing an example of a message list, representing retailer offers and promotions, returned in response to a user update request. Users can use this interface to save or delete messages. These actions are reported back to the server, which increments the counters tracking the Save and Delete Upper Limits respectively. This figure also provides examples of how the counters tracking the Save and Delete Upper Limits may be represented on the client device, for each message returning the in response to a user update request.

Figure 9:
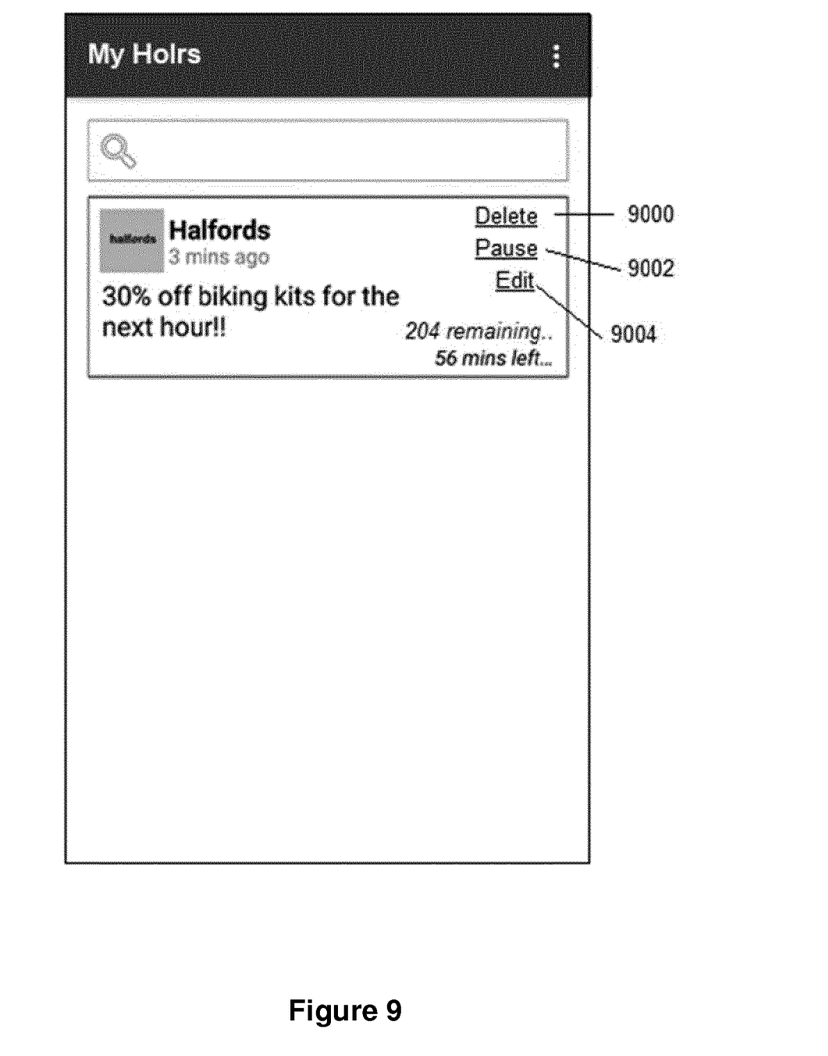
Figure 10:
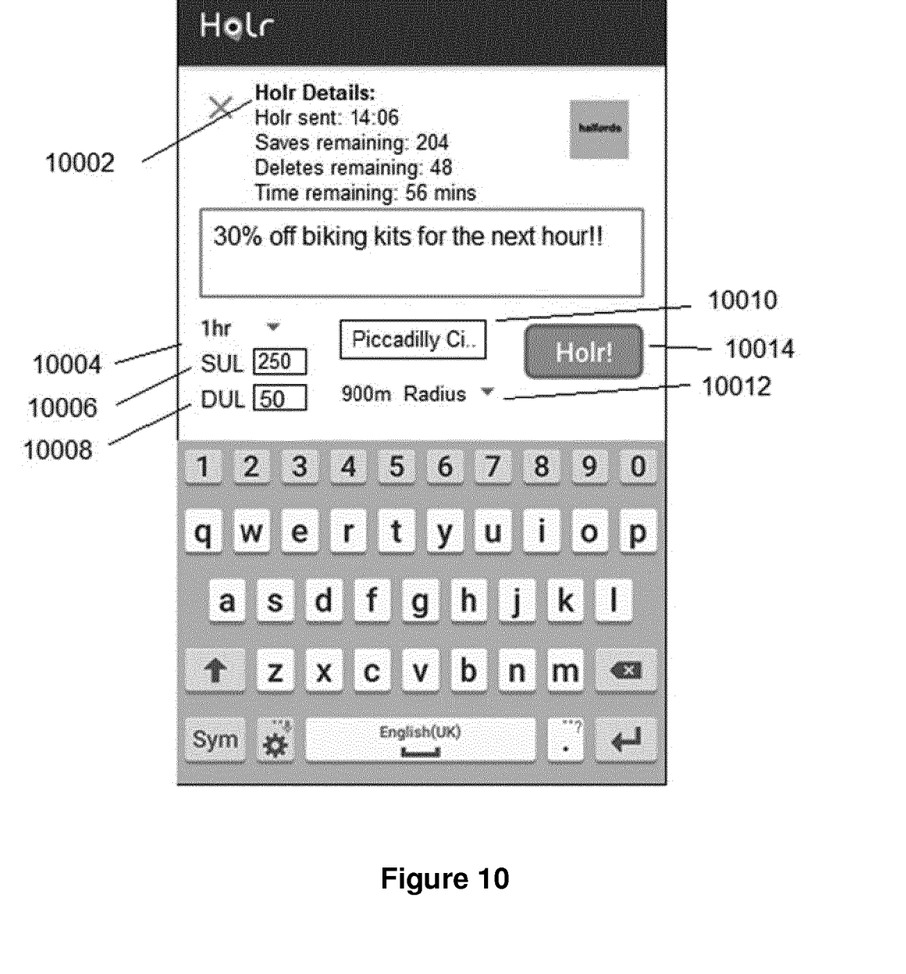

FIG. 9 provides an example of an administration screen, which allows a sender to delete, pause or edit their geo-location fence-based message. Senders have access to an interface that lists the messages that they have published. This screen provides a means to delete a message 9000, which deletes the geo-fence associated with the message, pause a message 9002, whereby the message is not deleted, but its geo-fence is temporarily disabled, or edit message content or criteria 9004. FIG. 10 provides an example of an administration screen that allows a user edit message content or criteria. When a user edits a published message, the system displays up-to-date information regarding processing of the message on the system 10002, including publication time, number of save actions remaining—as calculated according to the Save Upper Limit specified for this message, number of delete actions remaining—as calculated according to the original Delete Upper Limit specified for this message, and time remaining—as calculated according to time duration specified for this message. In addition to editing the content of the message, the user can change the time duration 10004, the Save Upper Limit 10006, Delete Upper Limit 10008, geo-coordinates 10010, geo-fence radius 10012 and re-publish the message 10014.

Based on the foregoing description, embodiments of the present disclosure can be used by businesses to limit message distribution based on time of day, the number of times the message can be saved to client devices, the number of times a message can be deleted via client devices, device location and a location specific to the context of the message, and a consumer's ability to save a message to their device.

For example, retailers may wish to issue a limited offer, which is finite in nature, to mobile devices passing within a specific range of their physical location, so that consumers can save this offer to their device while it is still valid, and subsequently redeem the offer. In this instance, the desire is to not limit the promotion by time, but by how many specific instances of the offer they wish to make available. If they are only giving away twenty offers, the geo-fence of the corresponding offer is destroyed once the twentieth person saves it to their device. Similarly, marketers may want to run short-term marketing campaigns where consumers passing within varying range of a location specific to that message can save that message to their device before it expires, or delete it. The effectiveness of their campaign may be judged on the numbers of people saving the campaign message versus those deleting it. The present disclosure can apply to other domains also. Law enforcement officials, for example, may want to publish a short-lived warning message within a specific proximity of a crash incident, which would only be relevant to road users within that proximity, and will disappear once the number of Delete actions reaches a limit, inferring the information may no longer be relevant, or an expiration time elapses. Depending on the circumstances and user need, the action of a user deleting a message via the interface may be interpreted as an acknowledgement of the message.

An embodiment of the present disclosure relates to a computer storage product with a non-transitory computer readable storage medium having computer code thereon for performing various computer-implemented operations related to methods of the present disclosure. The media and computer code may be specially designed and constructed for the purposes of the present disclosure, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICS"), programmable logic devices ("PLDs") and ROM and RAM devices. Examples of computer code include machine code, such as produced by a compiler, and files containing higher-level code that are executed by a computer using an interpreter. For example, an embodiment of the present disclosure may be implemented using JAVA®, C++ or other object-oriented programming language and development tools. Another embodiment of the present disclosure may be implemented in hardwired circuitry in place of, or in combination with, machine-executable software instructions.

The foregoing description, for purposes of explanation, used specific nomenclature to provide a thorough understanding of the present disclosure. However, it will be apparent to one skilled in the art that specific details are not required in order to practice the present disclosure. Thus, the foregoing descriptions of specific embodiments of the present disclosure are presented for purposes of illustration and description. They are not intended to be exhaustive or to limit the present disclosure to the precise forms disclosed; obviously, many modifications and variations are possible in view of the above teachings. The embodiments were chosen and described in order to best explain the principles of the present disclosure and its practical applications, they thereby enable others skilled in the art to best utilize the present disclosure and various embodiments with various modifications as are suited to the particular use contemplated. It is intended that the following claims and their equivalents define the scope of the present disclosure.

The invention claimed is:

1. A computer-implemented method for providing access to messages, the method comprising operating one or more processors associated with a server device to:
   receive a message from a sender device, the message comprising geo-location data, user interaction limit data, and time-to-live data, the time-to-live data of the messages comprises a time duration relative to a publication time of the message;
   create a transient geo-location fence using the geo-location data, user interaction limit data and the time-to-live data;
   allow the message to be accessed by a client device from within the transient geo-location fence; wherein the user interaction limit data of the message comprises at least one of a Save Upper Limit comprising a maximum number of times the message may be saved to client devices, and a Delete Upper Limit comprising a maximum number of times the message may be deleted via client devices;
   destroying the geo-location fence when at least one of the Save Upper Limit and Delete Upper Limit is reached; and
   destroying the geo-location fence when the time duration expires if at least one of the Save Upper Limit and Delete Upper Limit has been not reached.

2. The method of claim 1, wherein the geo-location data of the message comprises geo-coordinates of a physical location, and geo-range data.

3. The method of claim 1, wherein a previously destroyed geo-fence associated with a message is recreated if the sender updates the user interaction limit or time-to-live data.

4. The method of claim 1, comprising automatically reducing the geo-range of the geo-location fence as at least one of the Save and Delete Upper Limits are approached.

5. The method of claim 1, further comprising automatically increasing the geo-range of the geo-fence if one of the Save and Delete Upper Limits are increased.

6. The method of claim 1, wherein the publication time is the time at which the message is received by the server device from the sender device.

7. The method of claim 1, providing an administration interface to allow the sender to edit live messages.

8. The method of claim 7, wherein the administration interface is configured to allow the sender to update message content, pause, or delete a geo-location fence associated with a message, or edit the geo-location, user interaction limit data or time-to-live data used to create the geo-location fence.

9. The method of claim 1, comprising generating a dynamic message list, unique to each of a plurality of users, which is accessible in response to a user request from any of the plurality of users.

10. The method of claim 9, comprising generating the dynamic message list by determining live messages according to current geo-location data and previous user interactions of storing or discarding unexpired messages.

11. The method of claim 1, wherein the message comprises at least one of text, image and video content.

12. The method of claim 1, comprising providing a notification to a client device of a message accessible in a geo-location fence that is within a predetermined range of the current geo-location of the client device, the current geo-location of the client device not within the geo-location fence.

13. A computer-readable medium comprising non-transitory instructions which, when executed, cause one or more processors to perform the method according to claim 1.

* * * * *

UNITED STATES PATENT AND TRADEMARK OFFICE
CERTIFICATE OF CORRECTION

| | | |
|---|---|---|
| PATENT NO. | : 11,070,938 B2 | Page 1 of 1 |
| APPLICATION NO. | : 16/608594 | |
| DATED | : July 20, 2021 | |
| INVENTOR(S) | : Andrew Nolan | |

It is certified that error appears in the above-identified patent and that said Letters Patent is hereby corrected as shown below:

On the Title Page

Item (71) Applicant:
Reads "ANTITECH SOLUTIONS LIMITED"
Should read --ANITECH SOLUTIONS LIMITED--

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*